United States Patent

[11] 3,588,848

[72] Inventor Herman W. Van Beek
Houston, Tex.
[21] Appl. No. 847,223
[22] Filed Aug. 4, 1969
[45] Patented June 28, 1971
[73] Assignee The United States of America as represented by the Secretary of the Army

[54] INPUT-OUTPUT CONTROL CIRCUIT FOR MEMORY CIRCUIT
4 Claims, 1 Drawing Fig.

[52] U.S. Cl. .......... 340/173, 307/279, 307/238
[51] Int. Cl. .......... G11c 11/40, G11c 7/00
[50] Field of Search .......... 340/173; 307/238, 279

[56] References Cited
UNITED STATES PATENTS

| | | | |
|---|---|---|---|
| 3,267,295 | 8/1966 | Zuk | 307/279X |
| 3,447,137 | 5/1969 | Feuer | 340/173R |
| 3,493,786 | 2/1970 | Ahrons et al. | 307/279 |
| 3,521,242 | 7/1970 | Katz | 340/173R |

OTHER REFERENCES

Solid State Design, " Integrated MOS Transistor Random Access Memory" by Schmidt, pages 21— 25, January 1965, copy in 340- 173 S.S.

RCA Technical Notes, " NDRO Memory Cell Employing Insulated-Gate Field Effect Transistors" by Ahrons et al.

*Primary Examiner*—Stanley M. Urynowicz, Jr.
*Attorneys*—Harry M. Saragovitz, Edward J. Kelly, Herbert Berl and Julian C. Keppler

ABSTRACT: A control circuit for MOS memory circuits which provides a low impedance to bit lines during the "write" cycle and a high impedance during the "read" cycle so that the memory cell states won't be changed by control circuit signals.

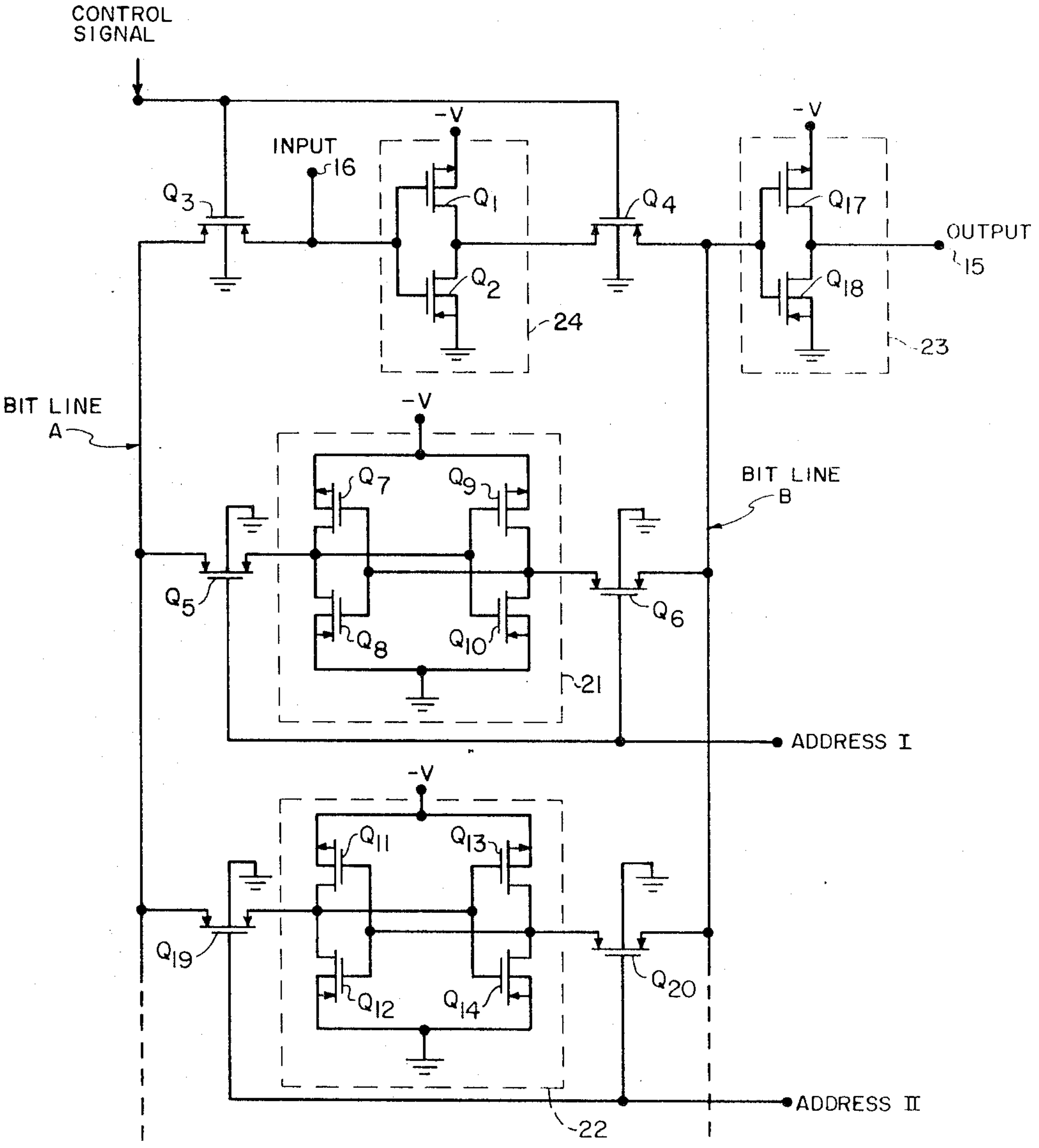
INVENTOR.
HERMAN W. VAN BEEK
BY: Harry M. Saragovitz,
Edward J. Kelly, AGENT
Herbert Berl &
Julian C. Keppler ATTORNEYS

INPUT-OUTPUT CONTROL CIRCUIT FOR MEMORY CIRCUIT

BACKGROUND OF INVENTION

The present invention relates generally to an electrical control circuit and in particular to a circuit used to control memory cells which are composed of MOS transistor circuits.

In the past static storage was generally accomplished by using bistable flip-flop circuits composed of transistors. In MOS transistor integrated circuits, a memory cell can be obtained by means of cross-coupled inverter circuits. As integrated circuit technology has progressed, the size of the semiconductor chips which can be made at high yield has increased. Additionally, the number of components which can be fabricated within a given area of the waver has also increased. The present invention provides digital circuitry for fabrication in integrated circuit structures.

SUMMARY OF INVENTION

The general purpose of the invention is to provide a control circuit for a complementary MOS integrated memory circuit. The advantages over prior art methods are that the write circuit used permits very low component count in the memory cell and minimizes wiring connection to the cell. In addition, the circuit that controls the flow of information to the memory cells has a low source impedance during the write cycle and a high impedance during the read or sampling cycle. If the source impedance is too low during the read cycle then the control circuits will change the state of the memory cell and the stored information will be lost. Further the logic function is obtained with a minimum number of components and the circuit takes full advantage of complementary MOS transistor characteristics.

DRAWING

The exact nature of the invention will be readily apparent from consideration of the following specification relating to the annexed drawing in which: The single FIG. shows a schematic diagram of the preferred embodiment of the invention.

DESCRIPTION OF PREFERRED EMBODIMENT

Referring now to the drawing, there is shown a complementary MOS control circuit composed of $Q_3$, $Q_4$, inverter 24 and two memory cells 21 and 22 each of which is itself composed of cross-coupled inverter circuits formed of MOS transistors $Q_7$, $Q_8$, $Q_9$ and $Q_{10}$ in the first instance and MOS transistors $Q_{11}$, $Q_{12}$, $Q_{13}$ and $Q_{14}$ in the second instance.

To write into one of the memory cells (21 for example), the control signal is set to 1, a 1 or 0 is applied to the input 16 and the appropriate address line (in this example address I) is tuned on or to the 1 state. The flip-flop circuit 21 will then be set. During the read cycle, the control signal is set to 0 and the address I is again turned on or to the 1 state. The state of flip-flop or memory cell 21 appears on the A bit line and in its inverted form on the B bit line. By inverting the signal on the B bit line through inverter 23 the state of the memory cell is sampled. The output 15 of the inverter 23 is in phase with the A line. Since $Q_3$ and $Q_4$ are both off, the impedance of the A and B lines is extremely high owing to the MOS transistors basic high input impedance characteristic. Even if one of the bit lines is at −v.(1) and the other at ground potential (0) the state of the flip-flop will not be affected. Each of the other memory cells, only one of which is shown, is connected to the "write" and "read" circuits as described for memory cell 21.

It should be understood that the foregoing disclosure relates to only a preferred embodiment of the invention and that modification may be made therein without departing from the scope of the invention as set forth in the appended claims.

I claim:

1. An integrated electrical control circuit comprising:
   a first and second MOS transistor each comprising an input, and output and a base;
   a control signal coupled to the base of each said transistor;
   a first inverter circuit composed of two complementary MOS transistors, said circuit having an input and an output;
   an input signal source connected to the input of said first MOS transistor and to the input of said first inverter circuit;
   the output of said first inverter circuit connected to the input of said second MOS transistor;
   a third, fourth, fifth and sixth MOS transistor each consisting of an input, an output and a base, the output of said second MOS transistor connected to the input of said fourth and sixth MOS transistor;
   the output of said first MOS transistor connected to the input of said third and fifth MOS transistor;
   a first and second memory circuit each of which consists of two cross coupled inverter circuits;
   each of said memory circuits having first and second control terminal;
   said output of the third MOS transistor connected to the first control terminal of the first memory circuit;
   said output of the fourth MOS transistor connected to the second control terminal of the first memory circuit;
   said output of the fifth MOS transistor connected to the first control terminal of said second memory circuit;
   said output of the sixth MOS transistor connected to the second control terminal of said second memory circuit;
   first and second address signal sources;
   said first address signal source connected to the base of the third and fourth MOS transistor;
   said second address signal source connected to the base of the fifth and sixth MOS transistor;
   a second inverter circuit consisting of two complementary MOS transistors and having an input and an output, and,
   the input of said second inverter circuit connected to the output of said second MOS transistor, the input of said fourth MOS transistor and the input of said sixth MOS transistor.

2. The circuit of claim 1 in which the inverter circuits comprising the memory circuits consist of two complementary MOS transistors.

3. A control circuit for an integrated complementary MOS memory circuit comprising:
   a first and second MOS transistor each having an input, an output and a base;
   a control signal source connected to the base of the first and second MOS transistors;
   a first and second inverter circuit each having an input and an output;
   an input signal source connected to the input of said first transistor and the input of said first inverter;
   the output of said first inverter connected to the input of said second transistor;
   the output of said second transistor connected to the input of said second inverter;
   at least two memory circuits each having a first, second and third control terminal;
   the output of said first transistor connected to the first control terminal of each memory circuit;
   the output of said second transistor connected to the second control terminal of each memory circuit, and,
   an address control signal source connected to the third control terminal of each memory circuit.

4. The circuit of claim three in which each of the inverters consists of two complementary MOS transistors.